Dec. 17, 1935.    E. A. TURNER    2,024,956
MATHEMATICAL INSTRUMENT
Filed Nov. 27, 1933
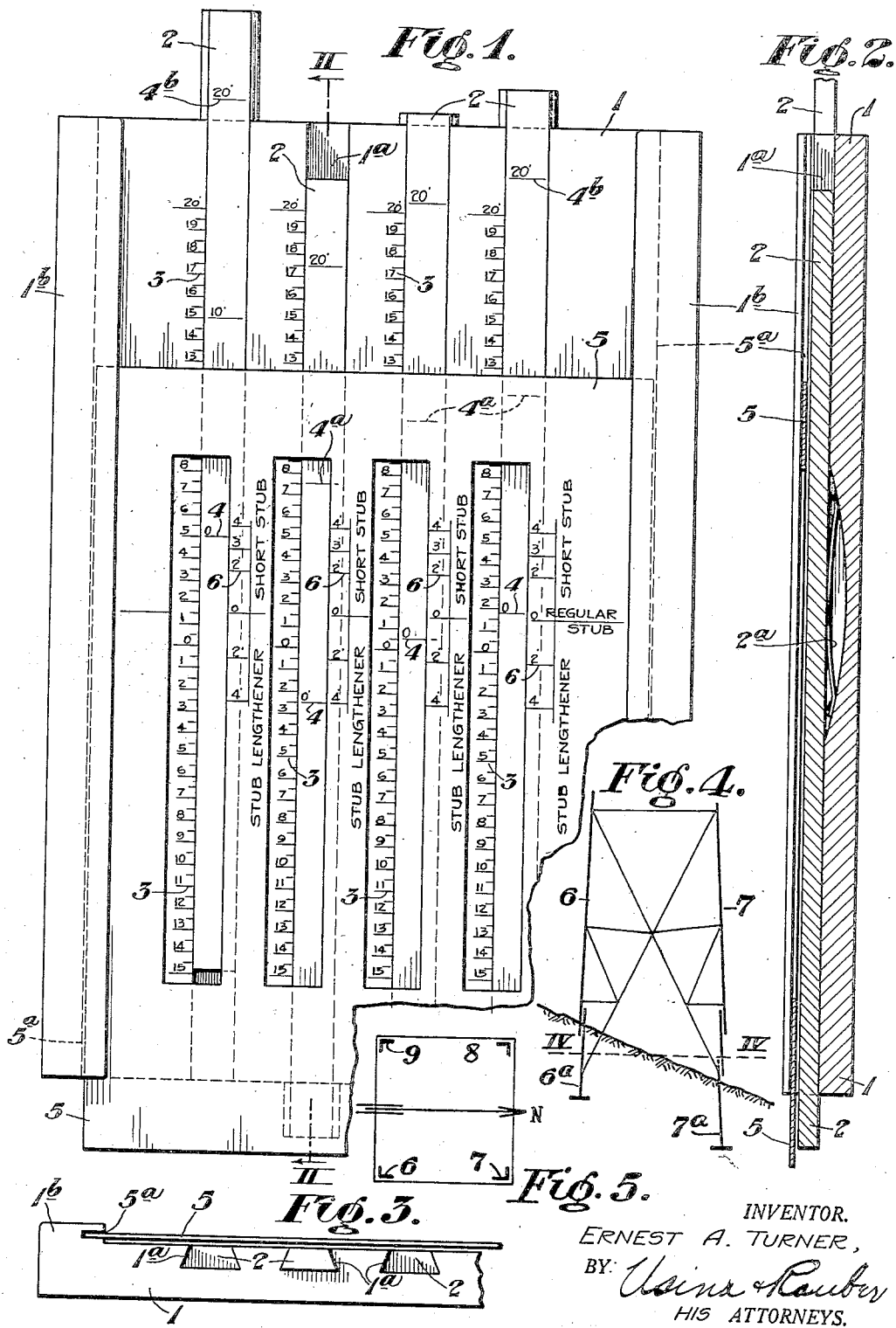
INVENTOR.
ERNEST A. TURNER,
BY Usina & Rauber
HIS ATTORNEYS.

Patented Dec. 17, 1935

2,024,956

UNITED STATES PATENT OFFICE 2,024,956

MATHEMATICAL INSTRUMENT

Ernest A. Turner, Roanoke, Va.

Application November 27, 1933, Serial No. 699,989

1 Claim. (Cl. 235—1)

This invention relates to the installation of structures of the type having adjustable supporting parts. The conventional transmission tower, such as is used to suspend electrical power lines, may be taken as an example of this type of structure, the adjustable parts being the usual leg stubs and lengtheners provided to eliminate excess excavation and to permit general adjustment, whereby the tower may be properly installed in rolling or mountainous country. As is well known, these leg stubs and lengtheners are detachable parts provided for proper setting of the tower on uneven ground.

It is apparent that certain mathematical computations must be made to obtain the proper adjustments, an object of the present invention being to provide an instrument for quickly and accurately ascertaining the best possible adjustment of such supporting parts. Other objects may be inferred.

The accompanying drawing illustrates the instrument as follows:

Figure 1 shows the front of the instrument in use.

Figure 2 is a cross-section from the line II—II in Figure 1.

Figure 3 shows a fragment of one end.

Figure 4 is an elevation of a transmission tower showing its adjustable parts adjusted in a manner ascertained by the use of this instrument.

Figure 5 is a cross-section taken from the line IV—IV in Figure 4.

As shown by the above, the instrument includes a base 1 carrying a plurality of adjustable parallel slides 2 which each represent one of the legs of the tower to be installed and are numbered accordingly. This base bears alined, graduated, plus-and-minus scales 3, each of which is adjacent one of the slides 2. The slides each bear a zero marking 4 which cooperates with the zero of the scales 3.

A movable template 5, cut to permit reading of the scales 3 and the zero markings 4 on the base and slides respectively, is also carried by the base. This template bears alined scales 6 which cooperate with the zero points 4 of the slides 2.

Each of the scales 3 represents feet, while the alined zero points of these scales represent the common base line of the tower to be installed, this being usually accepted as zero elevation of the installation. Since a transmission tower of the usual type permits only certain set adjustments of its leg stubs, the scales 6 on the template 5 are graduated accordingly. Thus the graduations above these scales' zero points represent possible adjustments of the short stubs, while those below represent possible adjustments of the stub lengtheners.

In operating the instrument, it is necessary to know the plus or minus elevation of each of the tower legs as regularly positioned respecting the common base line mentioned. Since each of the slides 2 represents a leg of the tower, they may be moved so that their zero markings 4 are directly opposite the proper plus or minus elevation readings on the adjacent scales 3. After this adjustment of the slides 2 the operator of the instrument has before him a graphic representation of all of the tower's legs and their relation to each other.

By sliding the template 5 along the base 1, the best possible combinations of the short stubs and lengtheners may be ascertained. Also, the amount of excess excavation for leveling off the ground will be indicated, the length of any special members needed can be determined, as well as whether these members are preferable to extra excavation, and the average change of the base elevation can be ascertained.

Figure 1 shows the invention set for use, it being presumed that a study of the terrain where the tower is to be installed has shown that, respecting the zero elevation, leg No. 1 has an elevation of plus 5 feet; leg No. 2, minus 2.5 feet; leg No. 3, plus 0.5 feet; and leg No. 4, 1.75 feet.

Therefore, slide No. 1 is moved upwardly so that its zero elevation mark is directly opposite the graduation representing plus 5 feet on the adjacent scale 3. Slide No. 2 is moved down so that its zero mark is opposite graduation minus 2.5 on its adjacent scale. Slides Nos. 3 and 4 are moved so their zero points are opposite the plus .5 and the plus 1.75 graduations on their respectively adjacent scales.

Inspection immediately shows that leg No. 2 must be the lowest one of the four legs, and that the other legs must be adjusted accordingly. Movement of the template 5 over the slides shows that the minimum of such adjustment can be obtained by using a 4 foot stub lengthener on leg No. 2, and complete adjustment obtained by shortening the short stub 3 feet on leg No. 1, using a one foot stub lengthener on leg No. 3 and the regular stub on leg No. 4.

Figures 4 and 5 show a tower installation that is illustrative of the above. The legs 6, 7, 8 and 9 are arbitrarily thought of as numbered 1 through 4, and the direction of the line happens to be north and south. Figure 4 shows legs No.

1 and No. 2, these being 6 and 7 in the figure, as facing the reader. The cross-sectional line IV—IV is placed at zero elevation so as to show the slope of the terrain, this being the same as that the instrument is set for. The short stub required for leg No. 1 and the stub lengthener required for leg No. 2 are numeraled 6a and 7a respectively, these being adjusted as indicated by the instrument.

The difference between the zero marks on the template, which represent the normal position of the stubs as applied to the tower's legs by the manufacture, and the zero points on the plus-and-minus scales 3, shows that the average base elevation of the tower has been raised 1.5 feet. The template graduations also indicate that six inches of excess excavation are necessary on leg No. 1, one foot excess excavation on leg No. 3, and .25 of a foot on leg No. 4. It is to be understood that it is always necessary to excavate to a certain depth to secure proper anchoring and that any further excavating is termed "excess excavation".

It is possible to provide the instrument with any number of slides, graduated to represent feet, meters, or other desired standard. The slides 2 may also be provided with suitably proportioned markings 4a which represent the ten foot lengtheners supplied by manufacturers with towers to be installed in very rough country. A second marking 4b may indicate twenty foot lengtheners. It is to be understood that since the scales 6 on the template 5 are graduated according to the standard adjustments possible with the towers being used, these scales may also be changed, according to the specifications of towers manufactured by different concerns.

As to the specific construction details of the instrument, the base 1 may be provided with recesses 1a in which springs 2a are positioned, the slides 2 being shaped to fit these recesses and the springs 2a functioning to prevent the movement from being too free. The template 5 may be of celluloid or the like and may slide in recesses 5a formed in upstanding ledges 1b provided by the base 1.

In addition, the different points on the scales 2 may be emphasized by differently coloring the portions between them. Also, the base 1 may be colored differently to either side of the zeros of the scales 3, and the template may be colored differently to more clearly distinguish the short stub and stub lengthener portions of the scales 6.

I claim:

An instrument for use in connection with the installation of a structure of the type having adjustable stub-legs and provided with lengthening legs, comprising a base carrying a plurality of adjustable parallel slides which each represent one of said structure's legs, said base bearing alined, graduated plus-and-minus scales, each of which is adjacent one of said slides and the latter each bearing a zero marking cooperative with said scales, said base also carrying a movable template having sight apertures for reading of said scales and zero points and bearing alined scales cooperative therewith, the last named scales being each graduated to either side of a zero point to indicate the size of said adjustable stub-legs and lenghtening legs.

ERNEST A. TURNER.